United States Patent
Schultz et al.

(10) Patent No.: US 11,531,329 B1
(45) Date of Patent: Dec. 20, 2022

(54) PREDICTIVE MAINTENANCE SYSTEMS AND METHODS OF A MANUFACTURING ENVIRONMENT

(71) Applicant: Ford Global Technologies, LLC, Dearborn, MI (US)

(72) Inventors: Brodie Schultz, Ferndale, MI (US); Elizabeth Bullard, Royal Oak, MI (US); Howard Lee Springston, Jr., Dundee, MI (US); Chandra Sekhar Jalluri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/406,821

(22) Filed: Aug. 19, 2021

(51) Int. Cl.
*G05B 23/02* (2006.01)

(52) U.S. Cl.
CPC ....... *G05B 23/0283* (2013.01); *G05B 23/024* (2013.01); *G05B 23/0221* (2013.01); *G05B 23/0235* (2013.01)

(58) Field of Classification Search
CPC .... G05B 23/00; G05B 23/02; G05B 23/0205; G05B 23/0259; G05B 23/0281; G05B 23/0283; G05B 23/0218; G05B 23/0221; G05B 23/0243; G05B 23/0248; G05B 23/0254; G05B 23/024; G05B 23/0235
See application file for complete search history.

(56) References Cited

U.S. PATENT DOCUMENTS

| 2019/0152011 | A1* | 5/2019 | Kummari | G06N 20/20 |
| 2019/0383705 | A1* | 12/2019 | Smart | G01M 15/12 |
| 2021/0148791 | A1* | 5/2021 | Huang | B25J 9/1674 |
| 2022/0156704 | A1* | 5/2022 | Shaw | G06Q 10/20 |

FOREIGN PATENT DOCUMENTS

| CN | 107992949 | 5/2018 |
| CN | 108681288 | 10/2018 |
| CN | 110333689 | 10/2019 |
| CN | 112558568 | 3/2021 |
| CN | 112731876 | 4/2021 |

* cited by examiner

*Primary Examiner* — Son T Le
*Assistant Examiner* — Matthew W. Baca
(74) *Attorney, Agent, or Firm* — Burris Law, PLLC (57) ABSTRACT

A method of monitoring one or more manufacturing components includes clustering vibration data associated with the one or more manufacturing components to generate a plurality of clusters, determining a vibration characteristic of the one or more manufacturing components based on the plurality of clusters, comparing auxiliary data associated with the one or more manufacturing components and an auxiliary data prediction model associated with the one or more manufacturing components, and determining an auxiliary characteristic of the one or more manufacturing components based on a comparison of the auxiliary data associated and the auxiliary data prediction model. The method includes determining a state of the one or more manufacturing components based on the vibration characteristic and the auxiliary characteristic and broadcasting a notification based on the state.

20 Claims, 4 Drawing Sheets

PREDICTIVE MAINTENANCE SYSTEMS AND METHODS OF A MANUFACTURING ENVIRONMENT

FIELD

The present disclosure relates to predictive maintenance systems and methods of a manufacturing environment.

BACKGROUND

The statements in this section merely provide background information related to the present disclosure and may not constitute prior art.

A manufacturing environment may include a plurality of computing systems to monitor characteristics associated with various manufacturing systems/components disposed in the manufacturing environment. As an example, the computing systems may be configured to track cycle time, component quality, and component health, among other characteristics. However, the computing systems may be configured to monitor characteristics for a given manufacturing system/component, thereby inhibiting a central computing system from performing integrated predictive analytics as a result of, for example, the latency among the computing systems, data redundancy, and the lack of synchrony among data formats used by the computing systems. The present disclosure addresses these and other issues associated with computing systems.

SUMMARY

This section provides a general summary of the disclosure and is not a comprehensive disclosure of its full scope or all of its features.

The present disclosure provides a method of monitoring one or more manufacturing components includes clustering vibration data associated with the one or more manufacturing components to generate a plurality of clusters, determining a vibration characteristic of the one or more manufacturing components based on the plurality of clusters, comparing auxiliary data associated with the one or more manufacturing components and an auxiliary data prediction model associated with the one or more manufacturing components, and determining an auxiliary characteristic of the one or more manufacturing components based on a comparison of the auxiliary data and the auxiliary data prediction model. The method includes determining a state of the one or more manufacturing components based on the vibration characteristic and the auxiliary characteristic and broadcasting a notification based on the state.

In some forms, the method further includes encoding the vibration characteristic to generate an encoded vibration value and encoding the auxiliary characteristic to generate an encoded auxiliary value. In some forms, the method further includes decoding the encoded vibration value to generate a decoded vibration value and decoding the encoded auxiliary value to generate a decoded auxiliary value, where the state is determined based on the decoded vibration value and the decoded auxiliary value. In some forms, the method further includes, for a set of nodes of a decision tree, generating a set of decisions associated with the set of nodes based on the decoded vibration value and the decoded auxiliary value, where the state is determined based on the set of decisions. In some forms, the auxiliary data with the one or more manufacturing components includes temperature data, electrical data, pressure data, flow rate data, cycle count data, input-output data, degradation data, or a combination thereof. In some forms, the auxiliary data prediction model associated with the one or more manufacturing components includes a predicted temperature regression model, a predicted electrical regression model, a predicted pressure regression model, a predicted flow rate regression model, a predicted cycle count regression model, a predicted input-output regression model, a predicted degradation regression model, or a combination thereof. In some forms, the vibration data associated with the one or more manufacturing components includes phase data, coherence data, frequency data, amplitude data, or a combination thereof. In some forms, the plurality of clusters are generated based on one of a connectivity-based clustering routine, a self-organizing map clustering routine, a centroid-based clustering routine, a density-based clustering routine, and a distribution-based clustering routine. In some forms, the method further includes obtaining the vibration data and the auxiliary data from a message queuing telemetry transport (MQTT) broker.

The present disclosure provides a system for monitoring one or more manufacturing components that includes a processor and a nontransitory computer-readable medium including instructions that are executable by the processor. The instructions include obtaining vibration data associated with the one or more manufacturing components and auxiliary data associated with the one or more manufacturing components, where the auxiliary data associated with the one or more manufacturing components includes temperature data, electrical data, pressure data, flow rate data, cycle count data, input-output data, degradation data, or a combination thereof. The instructions include clustering the vibration data to generate a plurality of clusters, determining a vibration characteristic of the one or more manufacturing components based on the plurality of clusters, comparing the auxiliary data and an auxiliary data prediction model associated with the one or more manufacturing components, and determining an auxiliary characteristic of the one or more manufacturing components based on a comparison of the auxiliary data and the auxiliary data prediction model. The instructions include determining a state of the one or more manufacturing components based on the vibration characteristic and the auxiliary characteristic, generating a predictive health model for controlling the one or more manufacturing components based on the vibration characteristic and the auxiliary characteristic, and broadcasting a notification based on at least one of the state and the predictive health model.

In some forms, the instructions further include encoding the vibration characteristic to generate an encoded vibration value and encoding the auxiliary characteristic to generate an encoded auxiliary value. In some forms, the instructions further include decoding the encoded vibration value to generate a decoded vibration value and decoding the encoded auxiliary value to generate a decoded auxiliary value, where the state is determined based on the decoded vibration value and the decoded auxiliary value. In some forms, the instructions further include, for a set of nodes of a decision tree, generating a set of decisions associated with the set of nodes based on the decoded vibration value and the decoded auxiliary value, where the state is determined based on the set of decisions. In some forms, the auxiliary data prediction model associated with the one or more manufacturing components includes a predicted temperature regression model, a predicted electrical regression model, a predicted pressure regression model, a predicted flow rate regression model, a predicted cycle count regression model, a predicted input-output regression model, a predicted degradation regression model, or a combination thereof. In some forms, the vibration data associated with the one or more manufacturing components includes phase data, coherence data, frequency data, amplitude data, or a combination thereof. In some forms, the plurality of clusters are generated based on one of a connectivity-based clustering routine, a self-organizing map clustering routine, a centroid-based clustering routine, a density-based clustering routine, and a distribution-based clustering routine.

The present disclosure provides a method of monitoring one or more manufacturing components includes clustering vibration data associated with the one or more manufacturing components to generate a plurality of clusters, where the vibration data associated with the one or more manufacturing components includes phase data, coherence data, frequency data, amplitude data, or a combination thereof, and where the plurality of clusters are generated based on one of a connectivity-based clustering routine, a self-organizing map clustering routine, a centroid-based clustering routine, a density-based clustering routine, and a distribution-based clustering routine. The method includes determining a vibration characteristic of the one or more manufacturing components based on the plurality of clusters. The method includes comparing auxiliary data associated with the one or more manufacturing components and an auxiliary data prediction model associated with the one or more manufacturing components, where the auxiliary data associated with the one or more manufacturing components includes temperature data, electrical data, pressure data, flow rate data, cycle count data, input-output data, degradation data, or a combination thereof. The method includes determining an auxiliary characteristic of the one or more manufacturing components based on a comparison of the auxiliary data associated and the auxiliary data prediction model. The method includes determining a state of the one or more manufacturing components based on the vibration characteristic, generating a predictive health model for controlling the one or more manufacturing components based on the vibration characteristic and the auxiliary characteristic, and broadcasting a notification based on at least one of the state and the predictive health model.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides for a predictive maintenance system that includes a plurality of distributed machine learning systems that collectively predict and diagnose various system states of one or more manufacturing substations, such as a computer numeric control (CNC) machine having one or more tooling elements (e.g., spindles, drill bits, lathes, routers, mills, grinders, among other tooling elements). As an example, the predictive maintenance system includes an unsupervised machine learning system and a supervised machine learning system. The unsupervised machine learning system is configured to generate a plurality of categorical outputs based on a clustering routine and on vibration data of the manufacturing substations. The supervised machine learning system is configured to perform a regression analysis based on auxiliary data of the substations. An additional supervised machine learning system comprising one or more neural network encoder/decoder layers that are configured to detect the state of the manufacturing substations based on the categorical outputs. As such, the predictive maintenance system accurately predicts and diagnoses various system states of one or more manufacturing substations.

Figure 1:
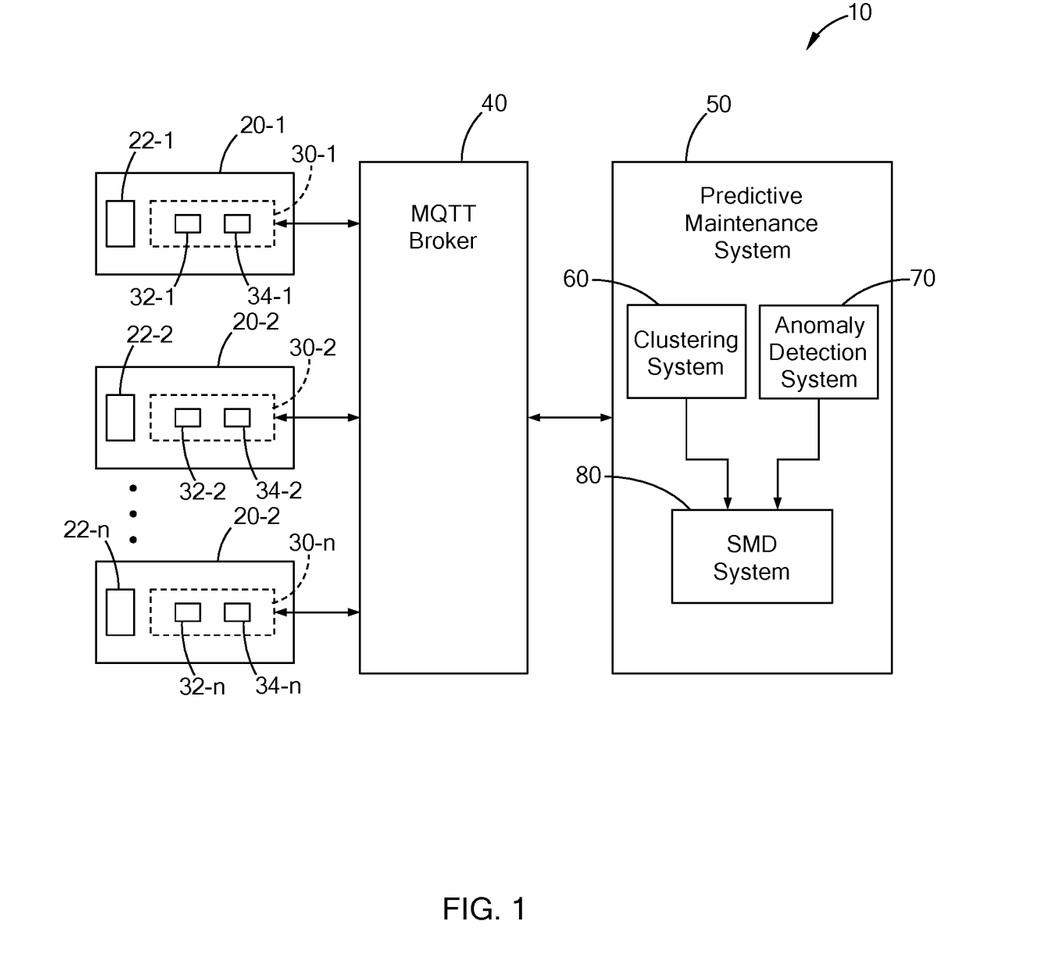
FIG. 1 is a functional block diagram of a manufacturing environment in accordance with the teachings of the present disclosure.

Referring to FIG. 1, a manufacturing environment 10 is provided and generally includes manufacturing subsystems 20-1, 20-2, . . . 20-n (collectively referred to herein as "manufacturing subsystems 20"), control systems 30-1, 30-2, . . . 30-n (collectively referred to herein as "control systems 30"), and a predictive maintenance system 50, which further includes a clustering system 60, an anomaly detection system 70, and a state and model determination system 80 (hereinafter referred to as "SMD system 80"). While the predictive maintenance system 50 is illustrated as part of the manufacturing environment 10, it should be understood that the predictive maintenance system 50 may be positioned remotely from the manufacturing environment 10. In one form, the manufacturing subsystems 20, the control systems 30, and the predictive maintenance system 50 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the manufacturing subsystems 20, the control systems 30, and the predictive maintenance system 50 are communicably coupled using a message queuing telemetry transport (MQTT) broker 40. In one form, the MQTT broker 40 authenticates and authorizes the manufacturing subsystems 20, the control systems 30, and the predictive maintenance system 50 so that each time one of the manufacturing subsystems 20, the control systems 30, and the predictive maintenance system 50 attempts to transmit/receive information, a new communication link does not need to be formed or maintained. Moreover, by maintaining a single connection for each of the manufacturing subsystems 20, the control systems 30, and the predictive maintenance system 50, information can be communicated between the manufacturing subsystems 20, the control systems 30, and the predictive maintenance system 50. Accordingly, the MQTT broker 40 reduces the latency of forming the direct communication links resulting from, for example, various authentication and authorization routines associated with forming direct communication links.

While the manufacturing environment 10 described herein includes the MQTT broker 40, it should be understood that other publish-subscribe messaging systems may be used and is not limited to the publish-subscribe messaging system described herein. As used herein, the phrase "publish-subscribe messaging systems" refers to systems that utilize a messaging broker for sending and receiving messages between the manufacturing subsystems 20, the control systems 30, and the predictive maintenance system 50.

In one form, the manufacturing subsystems 20 each include components 22-1, 22-2, . . . 22-*n* (collectively referred to herein as "components 22"). In one form, the components 22 include any components that are utilized during a manufacturing routine, such as a routine for making, storing, packaging, and/or distributing a product. As an example, the components 22 may include, but are not limited to: a fixture, a machine, a tool, an inspection system, a robot, a motor, a pump, a tie rod, a programmable logic controller (PLC), a conveyor belt, and/or a sensor. As a specific example, the components 22-1 include a machine and one or more tools configured to perform a manufacturing transformation on a workpiece. As used herein, a "manufacturing transformation" refers to an automated operation that is performed on a workpiece and may include, but is not limited to: heating the workpiece, removing material from the workpiece, joining the workpiece with another material, among other automated operations. While the components 22 described herein are shown as part of the manufacturing environment 10, it should be understood that the components 22 may be other types of components provided within other types of environment, such as equipment provided within a warehouse, packaging/distribution environment, a vehicle, or other types of industrial systems.

In one form, the control systems 30 each include a vibration data module 32-1, 32-2, . . . 32-*n* (collectively referred to herein as "vibration data modules 32"). The vibration data modules 32 are configured to monitor vibration data associated with the components 22 of the respective manufacturing subsystem 20 and generated by, for example, a vibration sensor (e.g., an accelerometer). In one form, the vibration data may include any metric indicating a vibration metric of the components 22, and the vibration data may include, but is not limited to: phase data, coherence data, frequency data, and/or amplitude data. As a specific example, the vibration data module 32-1 is configured to monitor vibration data of the one or more tools (as the components 22 of the manufacturing subsystems 20). In one form, the vibration data modules 32 may be configured to broadcast the vibration data and a corresponding timestamp to the predictive maintenance system 50 via the MQTT broker 40.

In one form, the control systems 30 each include a respective auxiliary data module 34-1, 34-2, . . . 34-*n* (collectively referred to herein as "auxiliary data modules 34"). The auxiliary data modules 34 are configured to monitor auxiliary data associated with the components 22 of the respective manufacturing subsystem 20 and generated by, for example, an auxiliary sensor (e.g., a temperature sensor, an electric current sensor, a voltage sensor, a pressure sensor, a flow rate sensor, among other sensors). In one form, the auxiliary data modules 34 may be configured to broadcast the auxiliary data and a corresponding timestamp to the predictive maintenance system 50 via the MQTT broker 40.

As used herein, "auxiliary data" refers to any additional type of operational data associated with the components 22, including, but not limited to: temperature data (e.g., a temperature, heat flux, and/or diffusivity of the components 22), electrical data (e.g., a voltage, current, power, resistance, impedance, capacitance, and/or inductance of the components 22), pressure data (e.g., differential pressure of a pump from among the components 22), flow rate data (e.g., a mass flow rate of a liquid flowing through a coolant line from among the components 22), cycle count data (e.g., a number of iterations in which the component 22 has performed a defined manufacturing process), input-output data (e.g., the integrity/validity of input and output data received from a programmable logic controller from among the components 22), degradation data (e.g., sensor data corresponding to the functionality and/or lifespan of the component 22), or a combination thereof.

In one form, the predictive maintenance system 50 receives the vibration data and the auxiliary data from the control systems 30 and is configured to determine a state of the respective manufacturing subsystems 20 and/or components 22. In one form, the clustering system 60 is an unsupervised machine learning system that is configured to cluster the vibration data to generate a plurality of clusters and determine a vibration characteristic of the components 22 based on the plurality of clusters. In one form, the anomaly detection system 70 is a supervised machine learning system configured to determine an auxiliary characteristic of the components 22 based on a comparison between the auxiliary data and an auxiliary data prediction model associated with the components 22. In one form, the SMD system 80 is configured to determine the state the respective manufacturing subsystems 20 and/or components 22 based on the determined vibration characteristic and the determined auxiliary characteristic. Additional details regarding the clustering system 60, the anomaly detection system 70, and the SMD system 80 are provided below with reference to FIGS. 2-3 and 4A-4B.

Figure 2:
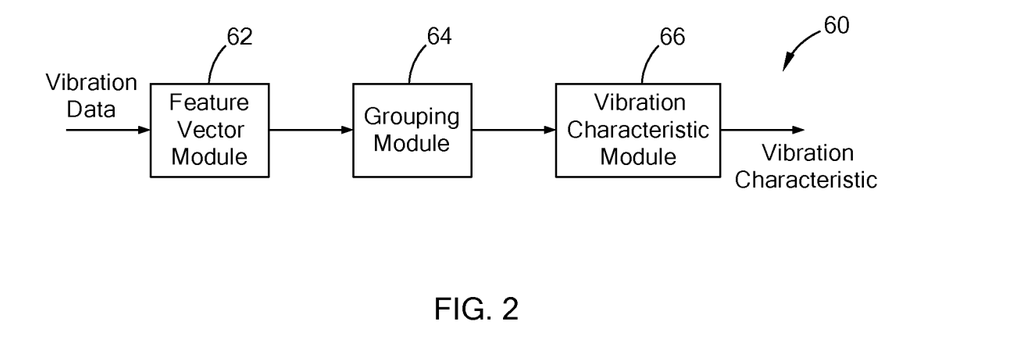
FIG. 2 is a functional block diagram of a clustering system in accordance with the present teachings of the present disclosure.

Referring to FIG. 2, the clustering system 60 includes a feature vector module 62, a grouping module 64, and a vibration characteristic module 66. It should be readily understood that any one of the components of the clustering system 60 can be provided at the same location or distributed at different locations (e.g., via one or more edge computing devices) and communicably coupled accordingly.

In one form, the feature vector module 62 is configured to generate a plurality of feature vectors based on the vibration data. The feature vector may be a vector having any number of dimensions (i.e., an n-dimensional vector) that represents the vibration data. As an example, the feature vector module 62 may generate an n-dimensional vector representing the phase data, coherence data, frequency data, and/or amplitude data of the one or more tools (as the components 22 of the manufacturing subsystems 20) in a time or space domain. As another example, the feature vector module 62 may perform a Fast Fourier Transform (FFT) routine on the vibration data and generate the n-dimensional vector based on the phase data, coherence data, frequency data, and/or amplitude data of the one or more tools in the frequency domain. It should be understood that the feature vector module 62 may generate the feature vector using other routines and is not limited to the examples described herein.

In one form, the grouping module 64 is configured to group the feature vectors into a plurality of clusters based on a clustering routine. Example clustering routines include but are not limited to a connectivity-based clustering routine (e.g., hierarchal clustering), a self-organizing map (SOM) clustering routine (e.g., a Kohonen SOM), a centroid-based clustering routine (e.g., k-means clustering), a density-based clustering routine (e.g., a mean shift clustering, a density-based spatial clustering (DBSCAN), among others), and a distribution-based clustering routine (e.g., Gaussian mixture models clustering). In one form, the number of clusters is predefined or selected based on known cluster number determination routines (e.g., the number of clusters is determined based on an elbow plot of the clusters). In one form, the grouping module 64 is configured to perform a validation routine (e.g., applying cluster validation indices) to determine whether the clusters match the original data and selectively adjust the clusters based on the results of the validation routine.

In one form, the vibration characteristic module 66 is configured to determine the vibration characteristic by categorizing the clusters. As an example, the vibration characteristic module 66 is configured to perform a dimension reduction routine (e.g., principal component analysis ((PCA) routine) to reduce the number of dimensions of the clusters to a predetermined number of dimensions having the largest feature influence and to categorize the clusters. As a specific example, the vibration characteristic module 66 performs the PCA routine to reduce three clusters to a two-dimensional representation corresponding to the frequency data and the amplitude data. As such, the vibration characteristic module 66 may identify a first cluster as data points having high frequency data and high amplitude data; a second cluster as data points having high frequency data, low amplitude data; and a third cluster as data points having low frequency data, low frequency data. It should be understood that the vibration characteristic module 66 may categorize the clusters with any suitable categorical description in other forms and is not limited to the examples described herein.

Figure 3:
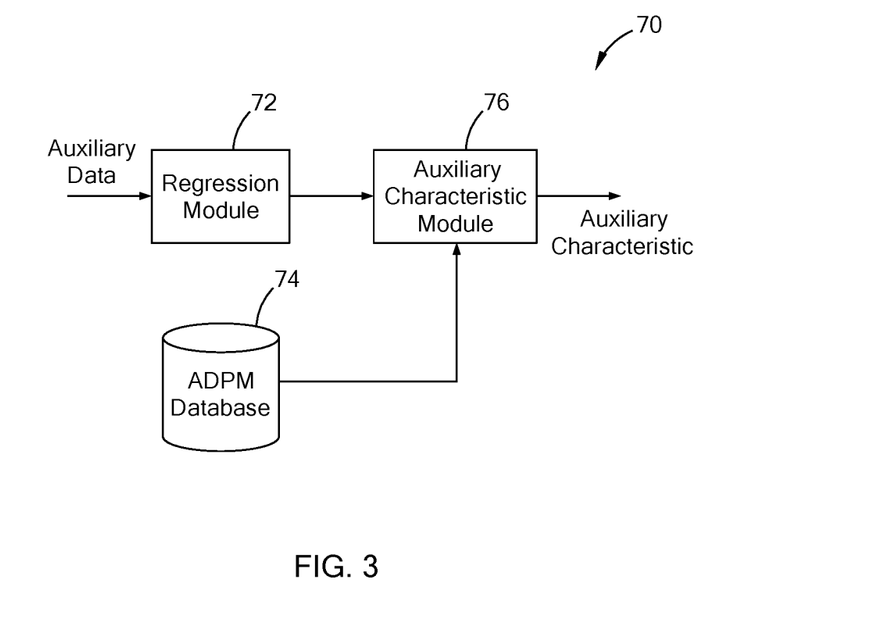
FIG. 3 is a functional block diagram of an anomaly detection system in accordance with the present teachings of the present disclosure.

Referring to FIG. 3, the anomaly detection system 70 includes a regression module 72, an auxiliary data prediction model (ADPM) database 74, and an auxiliary characteristic module 76. It should be readily understood that any one of the components of the anomaly detection system 70 can be provided at the same location or distributed at different locations (e.g., via one or more edge computing devices) and communicably coupled accordingly.

In one form, the regression module 72 is configured to generate a regression model (e.g., a multiple regression model or a multivariate regression model) based on the auxiliary data. In one form, the regression model is a linear regression model, a logistic regression model, a ridge regression model, a lasso regression model, a polynomial regression model, and/or a Bayesian linear regression model, among other regression models. As an example, the regression module 72 is configured to generate the regression model based on a series of auxiliary data and timestamps associated with the series of auxiliary data. As another example, the regression module 72 is configured to generate a regression model based on a set of the auxiliary data (e.g., a multivariate linear regression model that correlates electrical data, temperature data, degradation data, and timestamps).

In one form, the auxiliary characteristic module 76 is configured to determine the auxiliary characteristic by comparing the generated regression model with a corresponding auxiliary data prediction model stored in the ADPM database 74 to detect the presence of an anomaly. In one form, the auxiliary prediction models stored in the ADPM database 74 include a predicted temperature regression model, a predicted electrical regression model, a predicted pressure regression model, a predicted flow rate regression model, a predicted cycle count regression model, a predicted input-output regression model, a predicted degradation regression model, or a combination thereof (e.g., a multivariate predicted regression model based on a set of the auxiliary data). It should be understood that multiple auxiliary data prediction models may be stored for each of the components 22 and/or the manufacturing subsystems 20. In one form, the auxiliary data prediction models are generated during a training routine in which the anomaly detection system 70 is trained in accordance with known supervised training routines.

As an example, the auxiliary characteristic module 76 compares the generated linear regression model that is based on a series of electrical data and timestamps with the predicted electrical regression model associated with the given component 22 and/or manufacturing subsystem 20. If the generated linear regression model deviates from the predicted electrical regression model by a threshold value (e.g., a slope, an intercept, and/or at least one point of the generated model differs from a slope, an intercept, and/or at least one point of the predicted electrical regression model by +10%), the auxiliary characteristic module 76 determines that the component 22 and/or the manufacturing subsystem 20 has an electrical anomaly. Otherwise, if the generated linear regression model does not deviate from the predicted electrical regression model by the threshold value, the auxiliary characteristic module 76 determines that the component 22 and/or the manufacturing subsystem 20 does not have an electrical anomaly. It should be understood that the auxiliary characteristic module 76 may perform similar comparisons between the generated linear regression models and the corresponding auxiliary data prediction model stored to detect the presence of temperature anomalies, pressure anomalies, flow rate anomalies, cycle count anomalies, input-output anomalies, degradation anomalies, or a combination thereof.

Figure 4A:
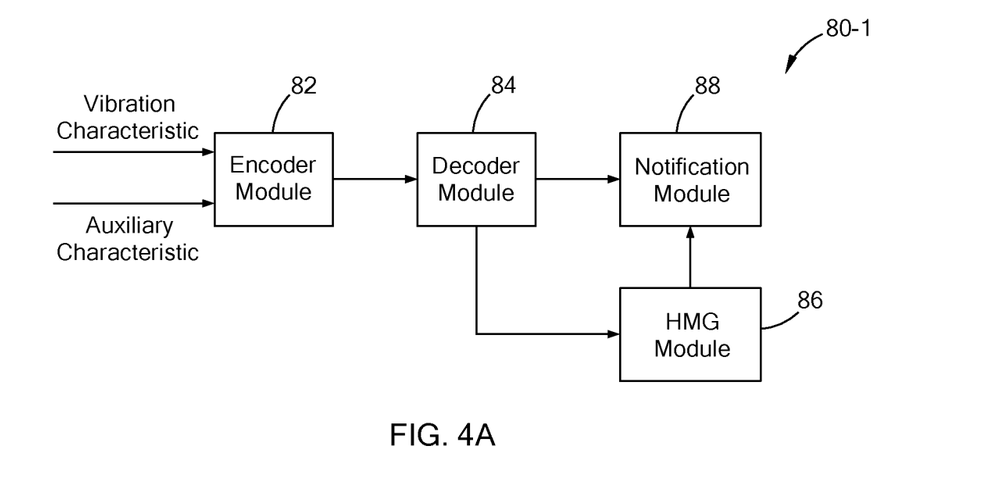
FIG. 4A is a functional block diagram of a state determination system in accordance with the present teachings of the present disclosure.

Referring to FIG. 4A, SMD system 80-1 (as the SMD system 80) includes an encoder module 82, a decoder module 84, a health model generator (HMG) module 86, and a notification module 88. It should be readily understood that any one of the components of the SMD system 80-1 can be provided at the same location or distributed at different locations (e.g., via one or more edge computing devices) and communicably coupled accordingly.

In one form, the encoder module 82 is configured to encode the vibration characteristic (i.e., the categorized clusters) and the auxiliary characteristic (i.e., the presence and/or type of anomaly) to generate an encoded vibration value and an encoded auxiliary value (collectively referred to as "encoded values"). In one form, the encoded values may be an integer, a binary vector, or a distributed representation. To perform the functionality described herein, the encoder module 82 may include a plurality of recurrent neural network layers (e.g., long short-term memory (LSTM) layers, gated recurrent unit (GRU) layers, among others) and an encoder layer that collectively generate and output the encoded values.

As an example, the encoder module 82 is configured to perform an integer encoding routine in which the vibration characteristic and the auxiliary characteristic are converted into an encoded vibration integer and an encoded auxiliary integer. As another example, the encoder module 82 is configured to perform a one-hot encoding routine in which the vibration characteristic and the auxiliary characteristic are converted into an encoded vibration binary vector and an encoded auxiliary binary vector. As an additional example, the encoder module 82 is configured to perform a learned embedded routine in which the vibration characteristic and the auxiliary characteristic are converted into an encoded vibration distribution representation and an encoded auxiliary distribution representation.

In one form, the decoder module 84 is configured to decode the encoded values to generate a decoded vibration value and a decoded auxiliary value (collectively referred to as "decoded values"). In one form, the decoded values may be an integer, a binary vector, or a distributed representation that correspond to a state of the component 22 and/or the manufacturing subsystem 20. As an example, the decoded values may correspond to a diagnosis that the component 22 and/or manufacturing subsystem 20 has failed and a corrective action is needed. As another example, the decoded values may correspond to a validation that a corrective action performed on the component 22 and/or manufacturing subsystem 20 (e.g., a repair) was performed properly. To perform the functionality described herein, the decoder module 84 may include a plurality of recurrent neural network layers (e.g., LSTM layers, GRU layers, among others) and a SoftMax layer that collectively generate and output the decoded values.

In one form, the HMG module 86 is configured to generate a predictive health model for controlling the component 22 and/or manufacturing subsystem 20 based on the vibration characteristic and the auxiliary characteristic. As an example, the HMG module 86 may generate a regression model (e.g., a multivariate regression model) based on the vibration and auxiliary characteristics. In one form, the regression model may correlate the vibration and auxiliary characteristics to various timestamps, thereby enabling a prediction of, for example, the component 22 and/or manufacturing subsystem 20 will not operate at a given time in future pursuant to an expected standard, tolerance, or criteria.

In one form, the notification module 88 is configured to broadcast a command and/or output an alarm, an alert, and/or a notification based on the state of the the component 22 and/or manufacturing subsystem 20 and/or the predictive health model. As an example, the notification module 88 may instruct an external or remote computing device (e.g., a visual display device, an audio device, a human machine interface (HMI), and/or a tactile feedback device provided within the manufacturing environment 10) to output an alarm in response to the state of the component 22 and/or manufacturing subsystem 20 indicating that a corrective action is needed. As another example, the notification module 88 may output an alert in response to the predictive health model indicating a predicted failure of the component 22 and/or manufacturing subsystem 20 in advance of a nominal failure date.

Figure 4B:
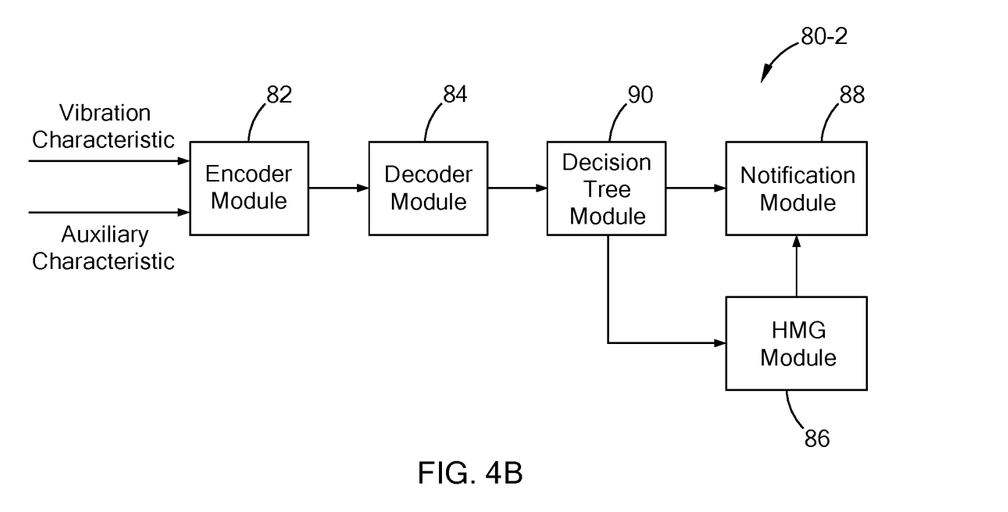
FIG. 4B is a functional block diagram of another example state determination system in accordance with the present teachings of the present disclosure.

Referring to FIG. 4B, SMD system 80-2 (as the SMD system 80) is shown and is similar to the SMD system 80-1, but in this form, the SMD system 80-2 includes a decision tree module 90. In one form, the decision tree module 90 includes a plurality of nodes that are each configured to generate a decision based on the decoded values. As an example, the plurality of nodes 90 may correspond to a decision regarding the categorized clusters, the types of auxiliary data, the values of the auxiliary data, the presence of an anomaly, or a combination thereof. Accordingly, the decision tree module 90 is configured to generate a set of decisions based on the decoded value that collectively may form a prediction corresponding to a state of the component 22 and/or the manufacturing subsystem 20.

Figure 5:
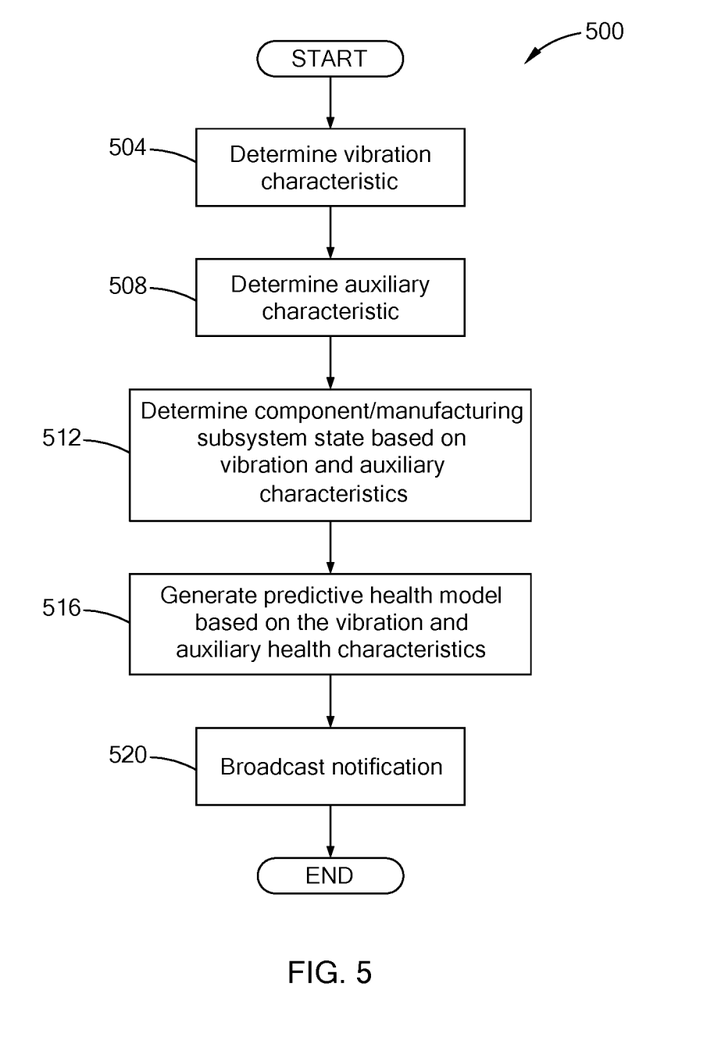
FIG. 5 illustrates an example control routine in accordance with the teachings of the present disclosure.

Referring to FIG. 5, a routine 500 for determining a state of the components 22 and/or the manufacturing subsystem 20 is provided. At 504, the clustering system 60 determines a vibration characteristic based on a clustering routine. At 508, the anomaly detection system 70 determines an auxiliary characteristic based on an anomaly detection routine. At 512, the SMD system 80 determines a state of the components 22 and/or the manufacturing subsystem 20 based on the vibration characteristic and the auxiliary characteristic. At 516, the SMD system 80 generates a predictive health model for controlling the component 22 and/or manufacturing subsystem 20 based on the vibration characteristic and the auxiliary characteristic. At 520, the notification module 88 of the SMD system 80 broadcasts a notification based on the state and/or the predictive health model.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of monitoring one or more manufacturing components, the method comprising:
   clustering, by an unsupervised learning system, vibration data associated with the one or more manufacturing components to generate a plurality of clusters;
   determining, by the unsupervised learning system, a vibration characteristic of the one or more manufacturing components based on the plurality of clusters;
   comparing, by a supervised learning system, auxiliary data associated with the one or more manufacturing components and an auxiliary data prediction model associated with the one or more manufacturing components;
   determining, by the supervised learning system, an auxiliary characteristic of the one or more manufacturing components based on the comparison of the auxiliary data and the auxiliary data prediction model;
   determining, by a recurrent neural network, a state of the one or more manufacturing components based on the vibration characteristic and the auxiliary characteristic;
   generating, by the recurrent neural network, a predictive health model for controlling the one or more manufacturing components based on the vibration characteristic and the auxiliary characteristic, wherein the predictive health model correlates the vibration characteristic and the auxiliary characteristic; and
   broadcasting, by the recurrent neural network, a notification based on the state.

2. The method of claim 1 further comprising:
   encoding the vibration characteristic to generate an encoded vibration value; and
   encoding the auxiliary characteristic to generate an encoded auxiliary value.

3. The method of claim 2 further comprising:
   decoding the encoded vibration value to generate a decoded vibration value; and
   decoding the encoded auxiliary value to generate a decoded auxiliary value, wherein the state is determined based on the decoded vibration value and the decoded auxiliary value.

4. The method of claim 3 further comprising, for a set of nodes of a decision tree, generating a set of decisions associated with the set of nodes based on the decoded vibration value and the decoded auxiliary value, wherein the state is determined based on the set of decisions.

5. The method of claim 1, wherein the auxiliary data associated with the one or more manufacturing components includes temperature data, electrical data, pressure data, flow rate data, cycle count data, input-output data, degradation data, or a combination thereof.

6. The method of claim 1, wherein the auxiliary data prediction model associated with the one or more manufacturing components includes a predicted temperature regression model, a predicted electrical regression model, a predicted pressure regression model, a predicted flow rate regression model, a predicted cycle count regression model, a predicted input-output regression model, a predicted degradation regression model, or a combination thereof.

7. The method of claim 1, wherein the vibration data associated with the one or more manufacturing components includes phase data, coherence data, frequency data, amplitude data, or a combination thereof.

8. The method of claim 1, wherein the plurality of clusters are generated based on one of a connectivity-based clustering routine, a self-organizing map clustering routine, a centroid-based clustering routine, a density-based clustering routine, and a distribution-based clustering routine.

9. The method of claim 1 further comprising obtaining the vibration data and the auxiliary data from a message queuing telemetry transport (MQTT) broker.

10. A system for monitoring one or more manufacturing components, the system comprising:
    a machine learning system comprising an unsupervised learning system, a supervised learning system, and a recurrent neural network, the machine learning system comprising one or more processors;
    the machine learning system comprising one or more nontransitory computer-readable mediums including instructions that are executable by the processor, wherein the instructions include:
       obtaining, by the unsupervised learning system, vibration data associated with the one or more manufacturing components and auxiliary data associated with the one or more manufacturing components, wherein the auxiliary data associated with the one or more manufacturing components includes temperature data, electrical data, pressure data, flow rate data, cycle count data, input-output data, degradation data, or a combination thereof;
       clustering, by the unsupervised learning system, the vibration data to generate a plurality of clusters;
       determining, by the unsupervised learning system, a vibration characteristic of the one or more manufacturing components based on the plurality of clusters;
       comparing, by the supervised learning system, the auxiliary data and an auxiliary data prediction model associated with the one or more manufacturing components;
       determining, by the supervised learning system, an auxiliary characteristic of the one or more manufacturing components based on the comparison of the auxiliary data and the auxiliary data prediction model;
       determining, by the recurrent neural network, a state of the one or more manufacturing components based on the vibration characteristic and the auxiliary characteristic;
       generating, by the recurrent neural network, a predictive health model for controlling the one or more manufacturing components based on the vibration characteristic and the auxiliary characteristic, wherein the predictive health model correlates the vibration characteristic and the auxiliary characteristic; and
       broadcasting, by the recurrent neural network, a notification based on at least one of the state and the predictive health model.

11. The system of claim 10, wherein the instructions further comprise:
    encoding the vibration characteristic to generate an encoded vibration value; and
    encoding the auxiliary characteristic to generate an encoded auxiliary value.

12. The system of claim 11, wherein the instructions further comprise:
decoding the encoded vibration value to generate a decoded vibration value; and
decoding the encoded auxiliary value to generate a decoded auxiliary value, wherein the state is determined based on the decoded vibration value and the decoded auxiliary value.

13. The system of claim 12, wherein the instructions further comprise, for a set of nodes of a decision tree, generating a set of decisions associated with the set of nodes based on the decoded vibration value and the decoded auxiliary value, wherein the state is determined based on the set of decisions.

14. The system of claim 10, wherein the auxiliary data prediction model associated with the one or more manufacturing components includes a predicted temperature regression model, a predicted electrical regression model, a predicted pressure regression model, a predicted flow rate regression model, a predicted cycle count regression model, a predicted input-output regression model, a predicted degradation regression model, or a combination thereof.

15. The system of claim 10, wherein the vibration data associated with the one or more manufacturing components includes phase data, coherence data, frequency data, amplitude data, or a combination thereof.

16. The system of claim 10, wherein the plurality of clusters are generated based on one of a connectivity-based clustering routine, a self-organizing map clustering routine, a centroid-based clustering routine, a density-based clustering routine, and a distribution-based clustering routine.

17. A method of monitoring one or more manufacturing components, the method comprising:
clustering, by an unsupervised learning system, vibration data associated with the one or more manufacturing components to generate a plurality of clusters, wherein the vibration data associated with the one or more manufacturing components includes phase data, coherence data, frequency data, amplitude data, or a combination thereof, and wherein the plurality of clusters are generated based on one of a connectivity-based clustering routine, a self-organizing map clustering routine, a centroid-based clustering routine, a density-based clustering routine, and a distribution-based clustering routine;
determining, by the unsupervised learning system, a vibration characteristic of the one or more manufacturing components based on the plurality of clusters;
comparing, by a supervised learning system, auxiliary data associated with the one or more manufacturing components and an auxiliary data prediction model associated with the one or more manufacturing components, wherein the auxiliary data associated with the one or more manufacturing components includes temperature data, electrical data, pressure data, flow rate data, cycle count data, input-output data, degradation data, or a combination thereof;
determining, by the supervised learning system, an auxiliary characteristic of the one or more manufacturing components based on the comparison of the auxiliary data and the auxiliary data prediction model;
determining, by a recurrent neural network, a state of the one or more manufacturing components based on the vibration characteristic and the auxiliary characteristic;
generating, by the recurrent neural network, a predictive health model for controlling the one or more manufacturing components based on the vibration characteristic and the auxiliary characteristic, wherein the predictive health model correlates the vibration characteristic and the auxiliary characteristic; and
broadcasting a notification based on at least one of the state and the predictive health model.

18. The method of claim 17 further comprising:
encoding the vibration characteristic to generate an encoded vibration value; and
encoding the auxiliary characteristic to generate an encoded auxiliary value.

19. The method of claim 18 further comprising:
decoding the encoded vibration value to generate a decoded vibration value; and
decoding the encoded auxiliary value to generate a decoded auxiliary value, wherein the state is determined based on the decoded vibration value and the decoded auxiliary value.

20. The method of claim 19 further comprising, for a set of nodes of a decision tree, generating a set of decisions associated with the set of nodes based on the decoded vibration value and the decoded auxiliary value, wherein the state is determined based on the set of decisions.

* * * * *